United States Patent
Farquharson et al.

(10) Patent No.: US 7,783,521 B2
(45) Date of Patent: Aug. 24, 2010

(54) ELECTRONIC SALES AND CONTRACTING METHOD, SYSTEM AND PROGRAM PRODUCT

(75) Inventors: Aston G. Farquharson, Carmel, NY (US); Karen L. Faison, Smyrna, GA (US); Jodie A. MacCrory, Houston, TX (US); Michael E. Weiner, Lawrenceville, NJ (US)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 11/141,281

(22) Filed: May 31, 2005

(65) Prior Publication Data

US 2006/0271444 A1 Nov. 30, 2006

(51) Int. Cl.
*G06Q 30/00* (2006.01)
(52) U.S. Cl. ............... 705/26; 705/27; 705/400; 705/7; 705/80; 380/44; 726/7; 725/58; 725/134; 700/83
(58) Field of Classification Search .......... 705/26, 705/27, 400, 7, 80; 380/44; 726/7; 725/58, 725/134; 700/83
See application file for complete search history.

(56) References Cited

U.S. PATENT DOCUMENTS

| | | | |
|---|---|---|---|
| 5,748,738 A | 5/1998 | Bisbee et al. | |
| 5,960,086 A * | 9/1999 | Atalla | 380/44 |
| 6,067,531 A | 5/2000 | Hoyt et al. | |
| 6,141,653 A | 10/2000 | Conklin et al. | |
| 6,167,383 A * | 12/2000 | Henson | 705/26 |
| 6,336,105 B1 | 1/2002 | Conklin et al. | |
| 6,338,050 B1 | 1/2002 | Conklin et al. | |
| 7,051,364 B1 | 5/2006 | Tackman et al. | |
| 7,069,234 B1 | 6/2006 | Cornelius et al. | |
| 7,343,208 B2 * | 3/2008 | Hoefler et al. | 700/83 |
| 2002/0062322 A1 | 5/2002 | Genghini et al. | |
| 2002/0138731 A1 | 9/2002 | Collamore et al. | |

(Continued)

FOREIGN PATENT DOCUMENTS

DE 19614789 C1 * 9/1997

(Continued)

OTHER PUBLICATIONS

Tadahiko Kataoka, "Information Materials for IDS" from JPO dated Sep. 26, 2007.

(Continued)

*Primary Examiner*—Yogesh C Garg
(74) *Attorney, Agent, or Firm*—William Schiesser; Hoffman Warnick LLC

(57) ABSTRACT

Under the present invention, a customer will login to a secure computer infrastructure and initially be polled and/or provide some input relating to an integrated IT solution that is desired. The customer can then make selections for hardware and/or software components desired for the integrated IT solution. The present invention will analyze the selections and verify whether each of the selected components is of similar quality to one another. If not, the customer can be alerted. The present invention will also make recommendations for services that best match the selected components. The integrated IT solution will then be finalized based on the components and services selected by the customer. Once the solution has been finalized, a corresponding contract(s) can be developed/generated, approved and executed within the secure computer infrastructure.

26 Claims, 8 Drawing Sheets

U.S. PATENT DOCUMENTS

| | | |
|---|---|---|
| 2002/0150241 A1 | 10/2002 | Scheidt et al. |
| 2002/0174023 A1 | 11/2002 | Grey et al. |
| 2003/0023507 A1* | 1/2003 | Jankelewitz .................. 705/26 |
| 2003/0023527 A1 | 1/2003 | Wilce et al. |
| 2003/0105966 A1 | 6/2003 | Pu et al. |
| 2003/0115129 A1 | 6/2003 | Feaver et al. |
| 2004/0044539 A1 | 3/2004 | Taricco et al. |
| 2004/0187152 A1* | 9/2004 | Francis et al. .................. 725/58 |
| 2005/0043979 A1* | 2/2005 | Soares et al. .................... 705/7 |

FOREIGN PATENT DOCUMENTS

| | | |
|---|---|---|
| JP | 2001357322 | 12/2001 |
| JP | 2002099843 | 4/2002 |
| JP | 2003296192 | 4/2002 |
| JP | 2003108725 | 4/2003 |
| WO | 03021405 | 3/2003 |
| WO | 03021405 A2 | 3/2003 |

OTHER PUBLICATIONS

Farquharson, U.S. Appl. No. 10/761,551, Notice of Allowance and Fees Due 2, Feb. 20, 2008, 6 pages.

Farquharson, U.S. Appl. No. 10/761,551, Notice of Allowance and Fees Due, Oct. 17, 2007, 6 pages.

Farquharson, U.S. Appl. No. 10/761,551, Office Action, Jul. 2, 2007, 10 pages.

Farquharson, U.S. Appl. No. 10/834,620, Office Action, Jul. 22, 2009, 13 pages.

Farquharson, U.S. Appl. No. 10/834,620, Office Action, Mar. 12, 2009, 10 pages.

Farquharson, U.S. Appl. No. 10/834,620, Office Action, Oct. 21, 2008, 11 pages.

Farquharson, U.S. Appl. No. 10/834,620, Office Action, Mar. 26, 2008, 9 pages.

U.S. Appl. No. 10/834,620, "Office Action", Dated Mar. 9, 2010, 11 pages.

* cited by examiner

10

MERGED DOCUMENT SIGNATURE PAGE:

MERGED DOCUMENT
PAGE 22 OF 22

THROUGH THE USE OF ELECTRONIC SIGNATURES, AS DEFINED IN THE IBM GLOBAL FINANCING SUBSCRIBER AGREEMENT EXECUTED BY THE PARTIES, BOTH PARTIES AGREE TO BE BOUND BY THE TERMS OF ALL AGREEMENTS INCLUDED IN THIS MERGED DOCUMENT.

ACCEPTED BY:
IBM CREDIT LLC

| FOR OR AS LESSOR: _____ | FOR OR AS LESSEE: _____ |
|---|---|
| BY: ELECTRONICALLY SIGNED BY | BY: ELECTRONICALLY SIGNED BY |
| *AUTHORIZED SIGNATURE* | *AUTHORIZED SIGNATURE* |
| THAO NGUYEN          2003-11-12 | KAKAN ROY          2003-11-12 |
| NAME (TYPE OR PRINT)    DATE | NAME (TYPE OR PRINT)    DATE |

STATE OF ORGANIZATION: _____

FIG. 8

ELECTRONIC SALES AND CONTRACTING METHOD, SYSTEM AND PROGRAM PRODUCT

CROSS-REFERENCE TO RELATED APPLICATIONS

This Application is related in some aspects to commonly assigned U.S. application Ser. No. 10/761,551, filed Jan. 21, 2004 and entitled "Method, System and Program Product for Electronically Executing Contracts Within a Secure Computer Infrastructure," which is hereby incorporated by reference. This Application is also related in some aspects to commonly assigned U.S. application Ser. No. 10/834,620, filed Apr. 29, 2004 and entitled "Method, System and Program Product for Protecting Electronic Contracts Created Within A Secure Computer Infrastructure," which is also hereby incorporated by reference.

FIELD OF THE INVENTION

The present invention generally relates to an electronic sales and contracting method, system and program product. Specifically, the present invention relates to a method, system and program product for electronically contracting the sale of an integrated Information Technology (IT) solution within a secure computer infrastructure.

BACKGROUND OF THE INVENTION

As use of computer networks becomes more pervasive, there is a growing need to provide for the electronic purchase of goods and services, as well as for the subsequent electronic execution/signature of corresponding contracts. Electronic execution of contracts can be both more efficient and cost effective than the traditional paper-based approach. Some specific types of contracts that are amenable to electronic execution including hardware and/or software purchase agreements, and related service agreements. For example, in purchasing computer hardware and/or software, a customer may also desire to purchase an associated service agreement. As is well known, these agreements often extend over a period of years and can have various pricing schedules. In many instances such contracts might have several different parties. For example, a first contract partner might sell hardware to a second contract partner who will resell the hardware to a customer along with a corresponding service package. Still yet, the first contract partner might sell hardware to a distributor who will resell the hardware to a second contract partner, who will then further resell the hardware and a corresponding service package to the customer.

Unfortunately, many concerns have been raised over electronic contract execution. One such concern is ensuring that electronically executed contracts are legally binding as intended. This concern was addressed in U.S. application Ser. No. 10/761,551, which was incorporated by reference above. Another concern with such contracts involves avoiding any legal complications such as those raised by the Sherman Antitrust Act. Specifically, with contracts involving multiple parties such as the examples set forth above, the law might require that the contract partner originally selling the hardware and/or software, be a different entity than the contract partner selling the service package. Moreover, the law might also require that the contract partner selling the hardware be isolated from the terms and conditions of the service-based contract between the second contract partner and the customer. This can be difficult unless it can be ensured a third party has not fraudulently executed a contract using another party's identity. This concern was addressed by the above-incorporated patent application. This latter concern was addressed by U.S. application Ser. No. 10/834,620, which was also incorporated by reference above.

Still yet another concern with existing technology involves providing the customer with an end to end interactive sales process whereby an integrated IT solution can be developed automatically, with as little human intervention as possible. An integrated IT solution is typically a solution that involves hardware and/or software components as well as related service packages. Because such solutions involve many areas of technical expertise as well as sales strategies and legal issues, current sales methods typically require numerous employees of the seller/provider to: (1) interface with the customer; (2) develop a solution; and (3) reduce the sale to a contract.

In view of the foregoing, there exists a need for an electronic sales and contracting method, system and program product. Specifically, a need exists for a system that will automate the end to end sales and contacting process while not compromising the security of any of the parties.

SUMMARY OF THE INVENTION

In general, the present invention provides an electronic sales and contracting method, system and program product. Specifically, the present invention provides an end-to-end sales and contracting system in which a customer can purchase an integrated IT solution and corresponding contracts can be executed within a secure computer infrastructure. Under the present invention, a customer will login to the secure computer infrastructure and initially be polled and/or provide some input relating to the integrated IT solution that is desired. The customer can then make selections for hardware and/or software components desired for the integrated IT solution. The present invention will analyze the selections and verify whether each of the selected components is of similar quality to one another. If not, the customer can be alerted. The present invention will also make recommendations for services that best match the selected components. The integrated IT solution will then be finalized based on the components and services selected by the customer. Once the solution has been finalized, a corresponding contract(s) can be developed/generated, approved and executed within the secure computer infrastructure.

A first aspect of the present invention provides an electronic sales and contracting method, comprising: receiving input from a customer in a secure computer infrastructure, wherein the input pertains to an integrated Information Technology (IT) solution desired by the customer; receiving a purchase selection of a set of IT components for the integrated IT solution from the customer in the secure computer infrastructure; verifying within the secure computer infrastructure that each of the set of IT components is of similar quality to one another; determining one or more recommendations to be made to the customer for the integrated IT solution within the secure computer infrastructure, wherein the one or more recommendations is based on the input and a current IT implementation of the customer; and finalizing the integrated IT solution within the secure computer infrastructure for sale to the customer.

A second aspect of the present invention provides an electronic sales and contracting system, comprising: a customer input system for receiving input from a customer in a secure computer infrastructure, wherein the input pertains to an integrated Information Technology (IT) solution desired by the customer; a selection system for receiving a purchase selection of a set of IT components for the integrated IT solution from the customer in the secure computer infrastructure; a quality verification system for verifying within the secure computer infrastructure that each of the set of IT components is of similar quality to one another; a recommendation system for determining one or more recommendations to be made to the customer for the integrated IT solution within the secure computer infrastructure, wherein the one or more recommendations is based on the input and a current IT implementation of the customer; and a solution finalization system for finalizing the integrated IT solution for sale to the customer within the secure computer infrastructure.

A third aspect of the present invention provides an electronic sales and contracting program product stored on a computer readable medium, the computer readable medium comprising program code for performing the following steps: receiving input from a customer in a secure computer infrastructure, wherein the input pertains to an integrated Information Technology (IT) solution desired by the customer; receiving a purchase selection of a set of IT components for the integrated IT solution from the customer in the secure computer infrastructure; verifying within the secure computer infrastructure that each of the set of IT components is of similar quality to one another; determining one or more recommendations to be made to the customer for the integrated IT solution within the secure computer infrastructure, wherein the one or more recommendations is based on the input and a current IT implementation of the customer; and finalizing the integrated IT solution for sale to the customer within the secure computer infrastructure.

A fourth aspect of the present invention provides a method for deploying an electronic sales and contracting application, comprising: providing a secure computer infrastructure being operable to: receive input from a customer that pertains to an integrated Information Technology (IT) solution desired by the customer; receive a purchase selection of a set of IT components for the integrated IT solution from the customer; verify that each of the set of IT components is of similar quality to one another; determine one or more recommendations to be made to the customer for the integrated IT solution, wherein the one or more recommendations is based on the input and a current IT implementation of the customer; and finalize the integrated IT solution for sale to the customer.

A fifth aspect of the present invention provides electronic sales and contracting computer software embodied in a propagated signal, the electronic sales computer software comprising instructions to cause a computer system to perform the following functions: receive input from a customer in a secure computer infrastructure, wherein the input pertains to an integrated Information Technology (IT) solution desired by the customer; receive a purchase selection of a set of IT components for the integrated IT solution from the customer in the secure computer infrastructure; verify within the secure computer infrastructure that each of the set of IT components is of similar quality to one another; determine one or more recommendations to be made to the customer for the integrated IT solution within the secure computer infrastructure, wherein the one or more recommendations is based on the input and a current IT implementation of the customer; and finalize the integrated IT solution within the secure computer infrastructure for sale to the customer.

Therefore, the present invention provides an electronic and contracting sales method, system and program product.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 8 depicts a final image of a contract according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

For convenience purposes, the Best Mode for Carrying Out the Invention includes the following sections:
I. General Description
II. Computerized Implementation
III. Process Flow Diagrams I. General Description In general, the present invention provides an electronic sales and contracting method, system and program product. Specifically, the present invention provides an end-to-end sales and contracting system in which a customer can purchase an integrated IT solution and corresponding contracts can be executed within a secure computer infrastructure. Under the present invention, a customer will login to the secure computer infrastructure and initially be polled and/or provide some input relating to the integrated IT solution that is desired. The customer can then make selections for hardware and/or software components desired for the integrated IT solution. The present invention will analyze the selections and verify whether each of the selected components is of similar quality to one another. If not, the customer can be alerted. The present invention will also make recommendations for services that best match the selected components. The integrated IT solution will then be finalized based on the components and services selected by the customer. Once the solution has been finalized, a corresponding contract(s) can be developed/generated, approved and executed within the secure computer infrastructure.

It should be understood in advance that the present disclosure is intended to incorporate all of the teachings of the two above-incorporated patent applications including the diagrams, interface pages, screen shots, etc., included therein. As such, although not depicted herein, the present invention should be understood to provide the same features and/or functionality. In some instances, the present disclosure may refer back to the above-incorporated applications for additional details. It should also be understood that as used herein, the term "integrated IT solution" is intended to refer to an IT solution that includes hardware components, software components and/or services.

II. Computerized Implementation

Figure 1:
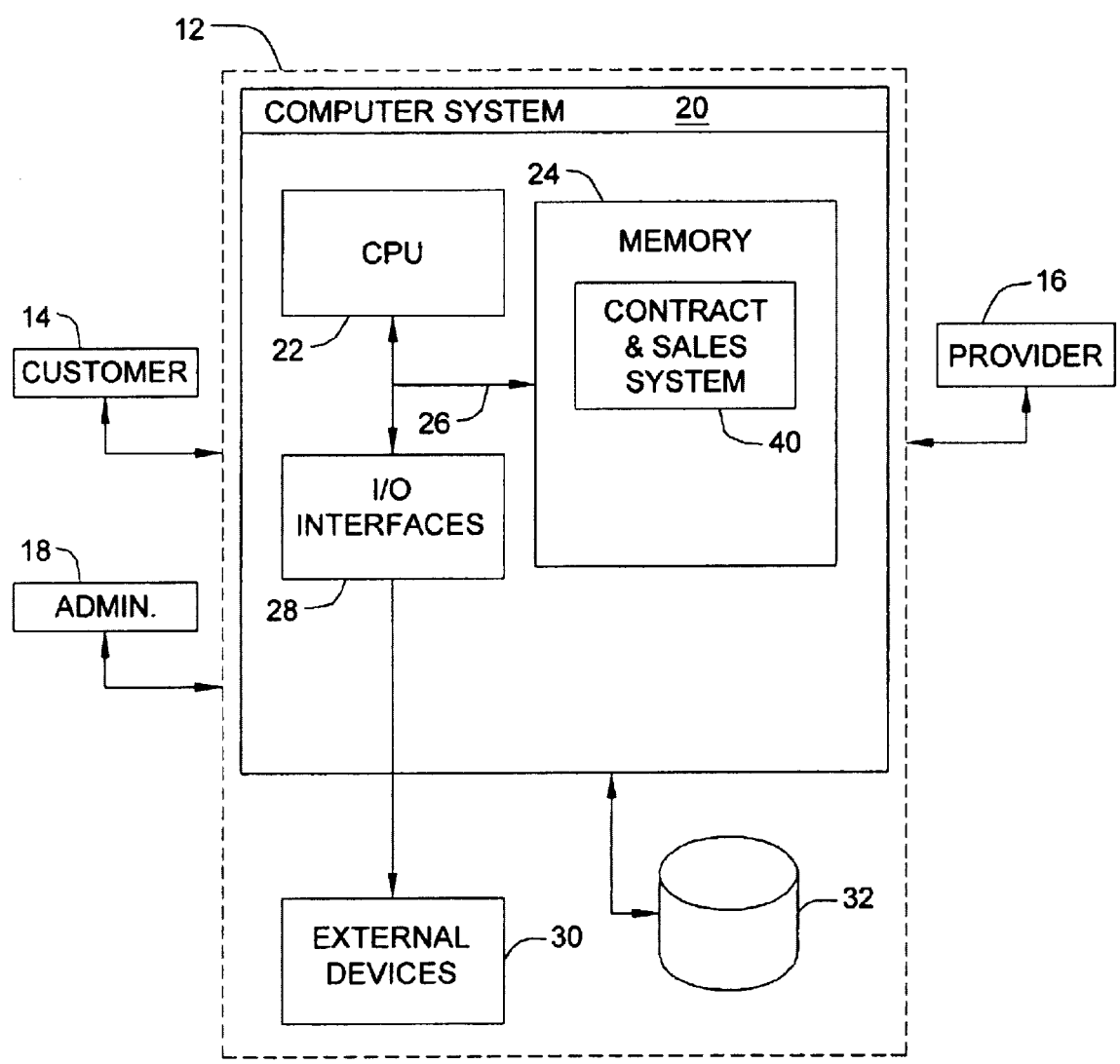
FIG. 1 depicts an illustrative system for conducting and contracting electronic sales according to the present invention.

Referring now to FIG. 1, there is illustrated an electronic sales and contract system 10 according to the present invention. As depicted, system 10 includes a computer infrastructure 12, which is intended to represent any type of computer architecture that is maintained in a secure environment (i.e., for which access control is enforced). As shown, infrastructure 12 includes a computer system 20 that typically represents a server or the like. It should be understood, however, that although not shown, other hardware and software components (e.g., additional computer systems, routers, firewalls, etc.) could be included in infrastructure 12.

In general, a customer 14 will interface with infrastructure 12 to electronically develop an integrated IT solution and contract to purchase the same from a provider/seller 16. To this extent, infrastructure 12 provides a secure environment. In general, the parties could access infrastructure 12 directly, or over a network via interfaces (e.g., web browsers) loaded on computerized devices (e.g., personal computers, laptops, handheld devices, etc. not shown in FIG. 1). In the case of the latter, the network can be any type of network such as the Internet, a local area network (LAN), a wide area network (WAN), a virtual private network (VPN), etc. In any event, communication with infrastructure 12 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 12.

It should be understood that under the present invention, infrastructure 12 could be owned and/or operated by a party such as provider 16, or by an independent entity. Regardless, use of infrastructure 12 and the teachings described herein could be offered to the parties on a subscription or fee-basis. In either scenario, an administrator 18 could support and configure infrastructure 12.

Computer system 20 is shown including a CPU (hereinafter "processing unit 22"), a memory 24, a bus 26, and input/output (I/O) interfaces 28. Further, computer system 20 is shown in communication with external I/O devices/resources 30 and storage system 32. In general, processing unit 22 executes computer program code, such as contract and sales system 40, which is stored in memory 24 and/or storage system 32. While executing computer program code, processing unit 22 can read and/or write data, to/from memory 24, storage system 32, and/or I/O interfaces 28. Bus 26 provides a communication link between each of the components in computer system 20. External devices 30 can comprise any devices (e.g., keyboard, pointing device, display, etc.) that enable a user to interact with computer system 20 and/or any devices (e.g., network card, modem, etc.) that enable computer system 20 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 20 is only representative of various possible computer systems that can include numerous combinations of hardware. To this extent, in other embodiments, computer system 20 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 22 may comprise a single processing unit, or be distributed across one or more processing units in one or more locations, e.g., on a client and server. Similarly, memory 24 and/or storage system 32 can comprise any combination of various types of data storage and/or transmission media that reside at one or more physical locations. Further, I/O interfaces 28 can comprise any system for exchanging information with one or more external devices 30. Still further, it is understood that one or more additional components (e.g., system software, math co-processing unit, etc.) not shown in FIG. 1 can be included in computer system 20. However, if computer system 20 comprises a handheld device or the like, it is understood that one or more external devices 30 (e.g., a display) and/or storage system(s) 30 could be contained within computer system 20, not externally as shown.

Storage system 32 can be any type of system (e.g., a database) capable of providing storage for information under the present invention. To this extent, storage system 32 could include one or more storage devices, such as a magnetic disk drive or an optical disk drive. In another embodiment, storage system 32 includes data distributed across, for example, a local area network (LAN), wide area network (WAN) or a storage area network (SAN) (not shown). Although not shown, additional components, such as cache memory, communication systems, system software, etc., may be incorporated into computer system 20.

Shown in memory 24 of computer system 20 is sales & contract system/program 40 (hereinafter program 40). Under the present invention, program 40 allows for the electronic sale of hardware, software and services, and well as for the customized creation, approval and electronic execution of related contracts. Moreover, program 40 allows the contracts to be secured to prevent access by one or more unauthorized parties. Specifically, as will be further described below, program 40 provides several key protocols/advantages not previously recognized such as: (1) end-to-end automated sales of an integrated IT solution; (2) security to infrastructure 12 is maintained (e.g., typically through 128 bit encryption); (3) confidentiality is maintained so that only appropriate parties can view data and contracts; (4) data integrity is maintained so that corruption does not occur; (5) data retention is provided so that the parties can later view the contract and its surrounding activity; (6) authentication is required so that only authorized parties can access the infrastructure 12 and pertinent contracts; (7) non-repudiation is provided by ensuring that the party executing the contract is the actual party and not a fraudulent user; and (8) data access is provided so that appropriate parties can view data relating to the contract process.

Figure 2:
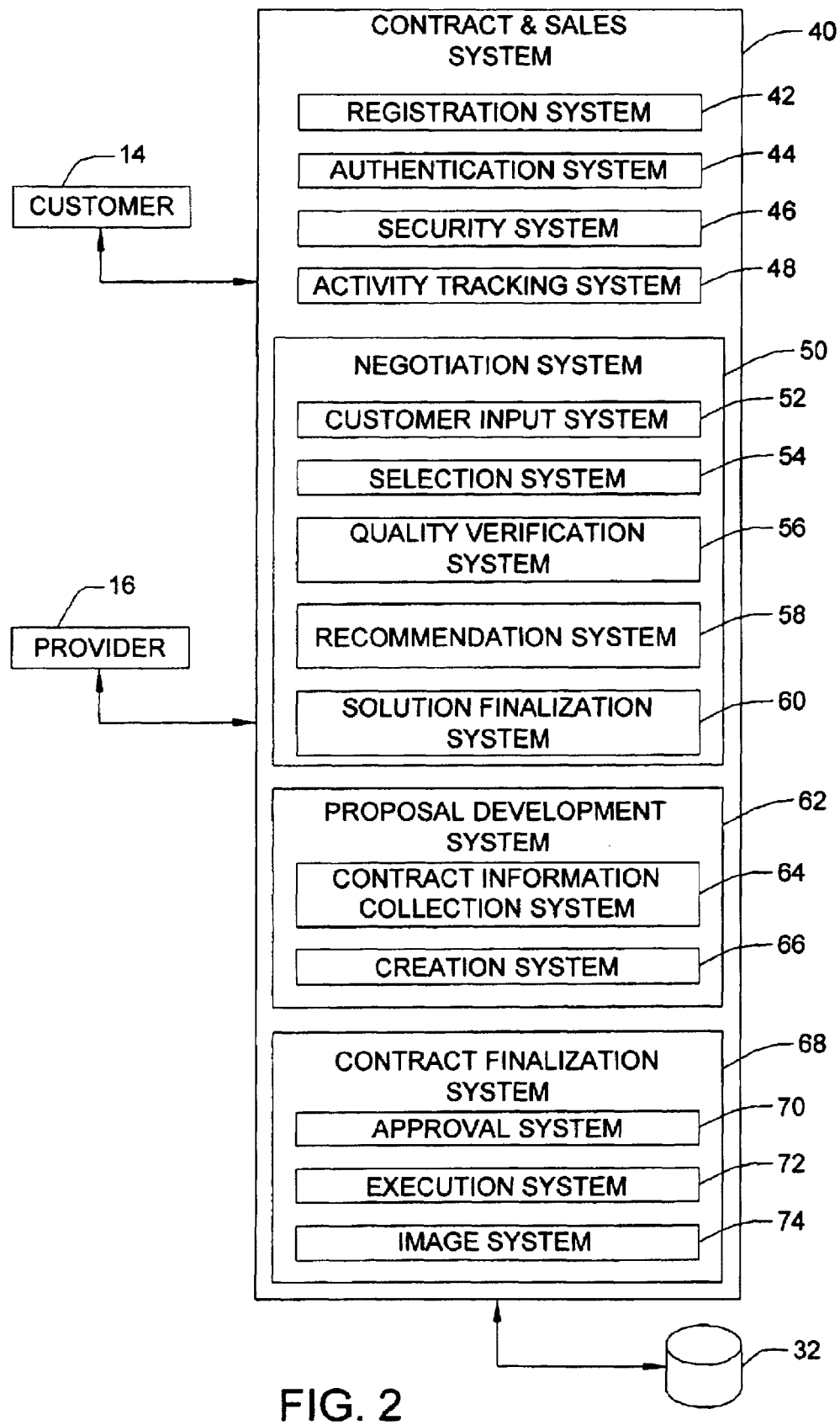
FIG. 2 depicts the sales and contract system of FIG. 1 in greater detail.

Referring now to FIG. 2, program 40 is shown in greater detail. As depicted, program 40 includes registration system 42, authentication system 44, security system 46, activity tracking system 48, negotiation system 50, proposal development system 62 and contract finalization system 68. Each of these systems represents program code that performs the function described below. In performing these functions, the systems within program 40 will likely generate any necessary interface pages and/or notifications that are used to electronically generate, approve and execute a contract under the present invention.

The functions of each of these systems will be further described below. In general, registration system 42 will be used to first register the parties. In the case where infrastructure 12 is owned/operated by provider 16, only registration of customer 14 might be necessary. In general, registration of a party entails obtaining profile information such as contact information, credit history, etc. Registration is also used so that parties can be later authenticated when attempting to access infrastructure 12. In addition, once profile information is obtained, registration system 42 can communicate with other external systems (not shown) to perform a credit check or the like on a registering party. Authentication system 44 ensures that only authorized parties can access infrastructure 12. Typically this is done based on login information such as a user name and password.

Security system 46 provides security for infrastructure 12 against hackers and the like. This is typically accomplished using 128 bit encryption or other similar method. Under the present invention, security system 46 also provides for separation and security of contracts within infrastructure 12. Activity tracking system 48 is used to track all activity occurring within infrastructure 12 (e.g., based on date and time as well as an IP address of the users performing the actions). For example, when a contract is created, an entry will be made in storage system 32 or the like. Similarly, as parties approve and execute the contracts, entries will be made in storage system 32. This allows a complete history of activity to be easily viewed.

Negotiation system 50 (and its subsystems) provides interface pages for customer 14 to develop and purchase an integrated IT solution. Proposal development system 62 allows a proposed contract for the sale of the integrated IT solution between customer 14 and provider 16 to be developed. Contract finalization system 68 facilitates the approval and execution of the proposed contract.

The functions of the present invention will be further described below in the context of an illustrative scenario. In this illustrative scenario, assume that customer 14 is seeking to purchase an integrated IT solution that includes computer hardware, software and related services. Further assume that customer 14 will be purchasing this solution from provider 16. To this extent, provider 16 may or may not be actually be supplying the components of the IT solution. Rather, provider 16 may interface with one or more third parties (not shown) to actually procure the ordered components to deliver to customer 14. Furthermore, this illustrative example assumes that provider 16 owns and operates infrastructure 12 of FIG. 1. However, this need not be the case. Rather infrastructure 12, computer system 20 and/or program 40 could be owned and/or operated by an independent third party (not shown).

In any event, before customer 14 can access infrastructure 12, customer 14 will first be registered as described above. As part of the registration process, an electronic notification (e.g., an e-mail) will be communicated to customer 14. The electronic notification will likely include a link such as a URL, which upon selection by customer 14, will provide initial access to infrastructure 12. Once this initial access is provided, authentication system 44 will provide customer 14 with user names and passwords for subsequent access of infrastructure 12. If provider 16 had not owned infrastructure 12 as in this example, it should be understood that provider 16 would have to register for its use as well.

Regardless, after customer 14 has registered and logged in, negotiation system 50 will be used to develop and order the desired integrated IT solution. Before any selections are made, customer input system 52 will be used to poll customer 14 and for customer 14 to provide input. Specifically, customer input system 52 will ask customer 14 a series of questions about their existing computer/IT environment, as well as questions about the type of integrated IT solution they are seeking. This information will be useful in developing the most appropriate integrated IT solution for customer 14. To this extent, customer input system 52 can provide customer 14 with a set of interfaces pages containing questions and fields or other mechanisms to provide input.

Once the input has been received from customer 14, selection system 54 can present customer 14 with a set of options for the integrated IT solution to select. Using these options, customer 14 can make a purchase selection of a set (e.g., one or more) of IT components for their desired IT solution. Specifically, customer 14 can select one or more hardware and software components for their desired solution. Once the selection(s) have been made, quality verification system 56 will verify whether each of the set of IT components selected by customer 14 is of similar quality to one another (e.g., "top of the line," "bottom of the line," etc.). Such a determination can be based on any number of factors such as industry ratings, etc. This information can be stored in storage system 32, provided from outside sources, etc. Verifying the quality of the selections made by customer 14 not only helps ensure consistency in their desired integrated IT solution, but it also helps ensure that the components selected will function in an optimal fashion with one another. To this extent, quality verification system 56 could also verify a compatibility of the selected components with one another. For example, quality verification system 56 could determine whether a component will conflict with another component selected by customer 14. If any conflicts exist, or the selected components are determined not to be of similar quality to one another, quality verification system 56 can (electronically) alert customer 14.

Based on the selection(s) made by customer 14 and the input provided, recommendation system 58 will automatically determine one or more recommendations to be made to customer 14. The recommendations typically pertain to services that best match the components of the integrated IT solution selected by customer 14, as well as an existing IT implementation/environment of customer 14. For example, it could be that a certain service (e.g., installation, maintenance provided by a particular company, etc.) is best suited for a certain hardware component selected by customer. Moreover, it could be that a certain service is best suited for customer 14 given his/her current IT implementation. Such a service would be recommended to customer 14 by recommendation system 58. Information for making recommendations can be drawn from storage system 32 and/or outside sources. The recommendation of services provided under the present invention can be especially valuable to customer 14 because customer 14 would at least be made aware of services that best match the selected components.

After customer 14 has selected any desired services to accommodate their hardware and/or software sections, solution finalization system 60 will finalize (e.g., package and present) the selections into the integrated IT solution. For example, solution finalization system 60 would present customer 14 with a graphic, screen, etc. showing the selections made, the recommendations, and giving customer 14 an opportunity to make any changes.

Once the integrated IT solution has been finalized, proposal development system 62 and contact finalization system 68 will develop a corresponding proposed contract, and then seek approval for and execution of the same. Before these systems are discussed in greater detail, it should be appreciated once again that the present invention is intended to incorporate all of the teachings and disclosure of the two above-incorporated patent applications that all of the teachings. As such the screen shots/interface pages of the two above-incorporate patent applications will not be shown and discussed herein for brevity purposes. However, the procedure for developing and finalizing a contract under the present invention will be further discussed below in accordance with the process flow diagrams of FIGS. 3-8.

In any event, once the integrated IT solution has been finalized, contract information collection system 64 will collect all necessary information to develop a proposed contract. Such information can not only include customer 14 and/or provider 16 information (e.g., from their respective "accounts"), but also pricing and delivery schedule information. For example, if customer 14 selected hardware components "1-3," software components "7-9" and services "A-B," contract information collection system 64 could determine a proposed price as well as a time table for delivery and deployment/installation of solution. Also, contract information collection system 64 will automatically apply any adjustments to the price such as discounts, volume discounts, rebates, etc. Thereafter, creation system 66 could actually develop the proposed contract that includes the terms. Once the proposal is developed, it could be stored in storage unit 32, and approval system 70 would solicit its approval therefore from customer 14 and provider 16. After such approval was provided, execution system 72 would then seek execution of the contract from customer 14 and provider 16. After the contract was executed, image system 74 would develop a final image of the contract for viewing by customer 14 and provider 16. In general, the soliciting of approval and execution of the proposed contract can be done through any electronic means such as an electronic message that contains a link, upon the selection of which requests login and then presents the necessary interface pages for approval and execution. A more detailed sampling of the messages and interface pages is shown in the two above-incorporated patent applications.

Regardless, as indicated above, as this process is occurring, activity tracking system 48 will track all activities. For example, when customer 14 makes his/her selections, gives his/her approval and executed the contract, all such activities can be recorded along with the date and time and even an IP address of the computer system from which each activity was conducted. This provides additional security and anti-repudiation protection.

III. Process Flow Diagrams

Figure 3:
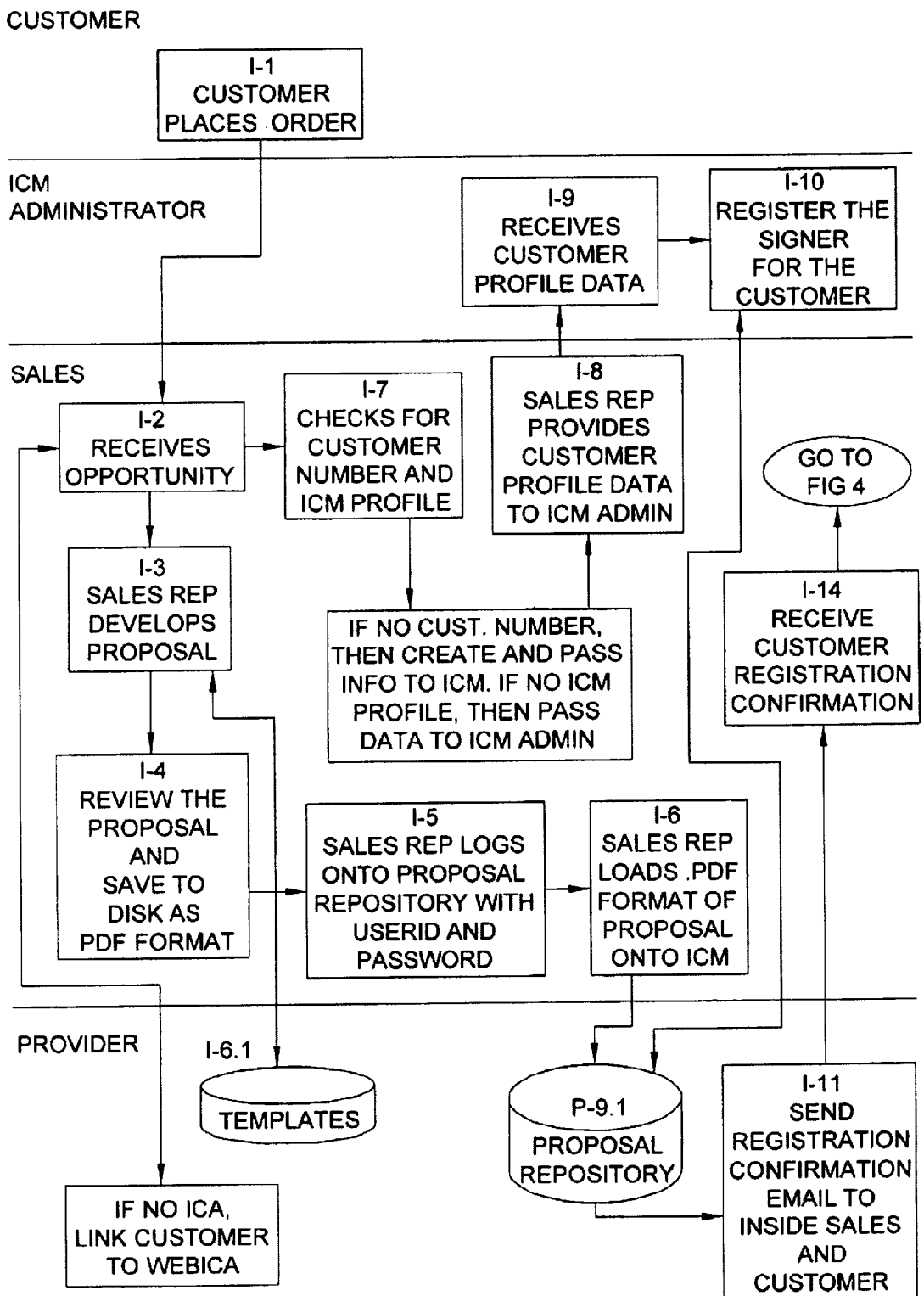
FIG. 3 depicts a first flow diagram according to the present invention.

Referring now to FIGS. 3-8, flow diagrams of the contract proposal development, approval and execution processes of the present invention are shown. Referring first to FIG. 3, in step I-1, the customer places his/her order. As indicated above, this involves selecting various hardware and/or software components as well as related services. The selections are received as an opportunity in step I-2. Upon receipt, in step I-3, a sales representative will develop the proposal using templates I-5.1 via proposal development system 62. Once developed, the proposal can be saved to a disk in step I-4 and the sales representative can log into a proposal repository in step I-5. In step I-6, the sales representative will load the proposal into the repository. As this is occurring, the customer will be registered to access the repository. Specifically, in step I-7 the sales representative will check for the customer number and profile. If none exists, then an administrator will be passed the appropriate information. If, however, a profile does exist, it will be passed to the administrator in step I-8. Upon receipt in step I-9, the signer for the customer will be registered in step I-10 to access the repository. In step I-11, registration confirmation is sent to the customer, which is received in step I-14.

Figure 4:
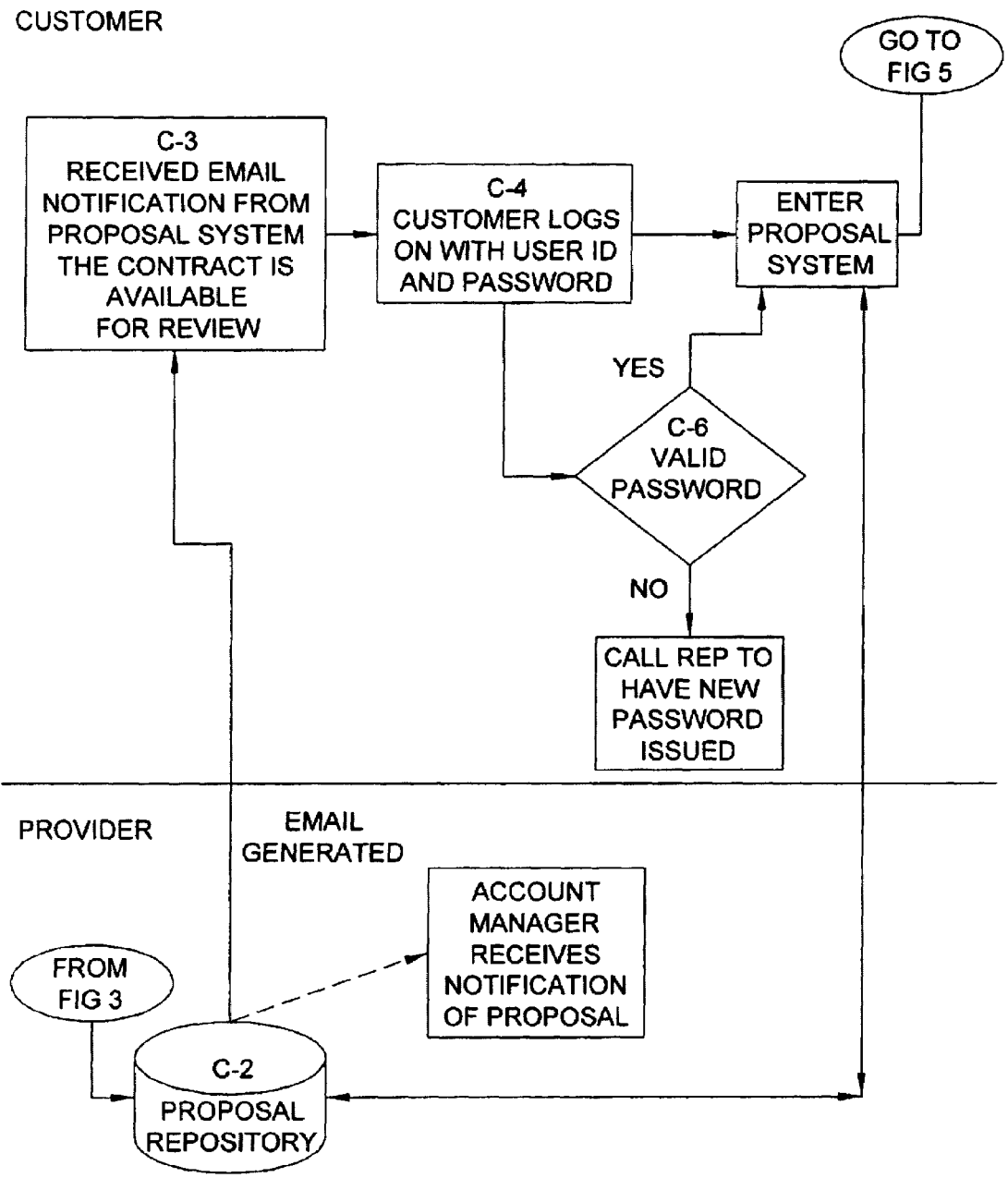
FIG. 4 depicts a second flow diagram according to the present invention.

The process continues in FIG. 4. Specifically, in step C-3, the customer receives notification that the proposed contract is available for review in the repository. In a similar fashion, an account manager for the provider will receive notification in step C-2. In step C-4, the customer will log into the computer infrastructure with their user identification and password. At step C-6, it is determined whether the password is valid. If not, a representative will be contacted so that a new password can be reissued. If, however, the password is valid, the customer will "enter" a proposal system to view the proposed contract in step C-7.

Figure 5:
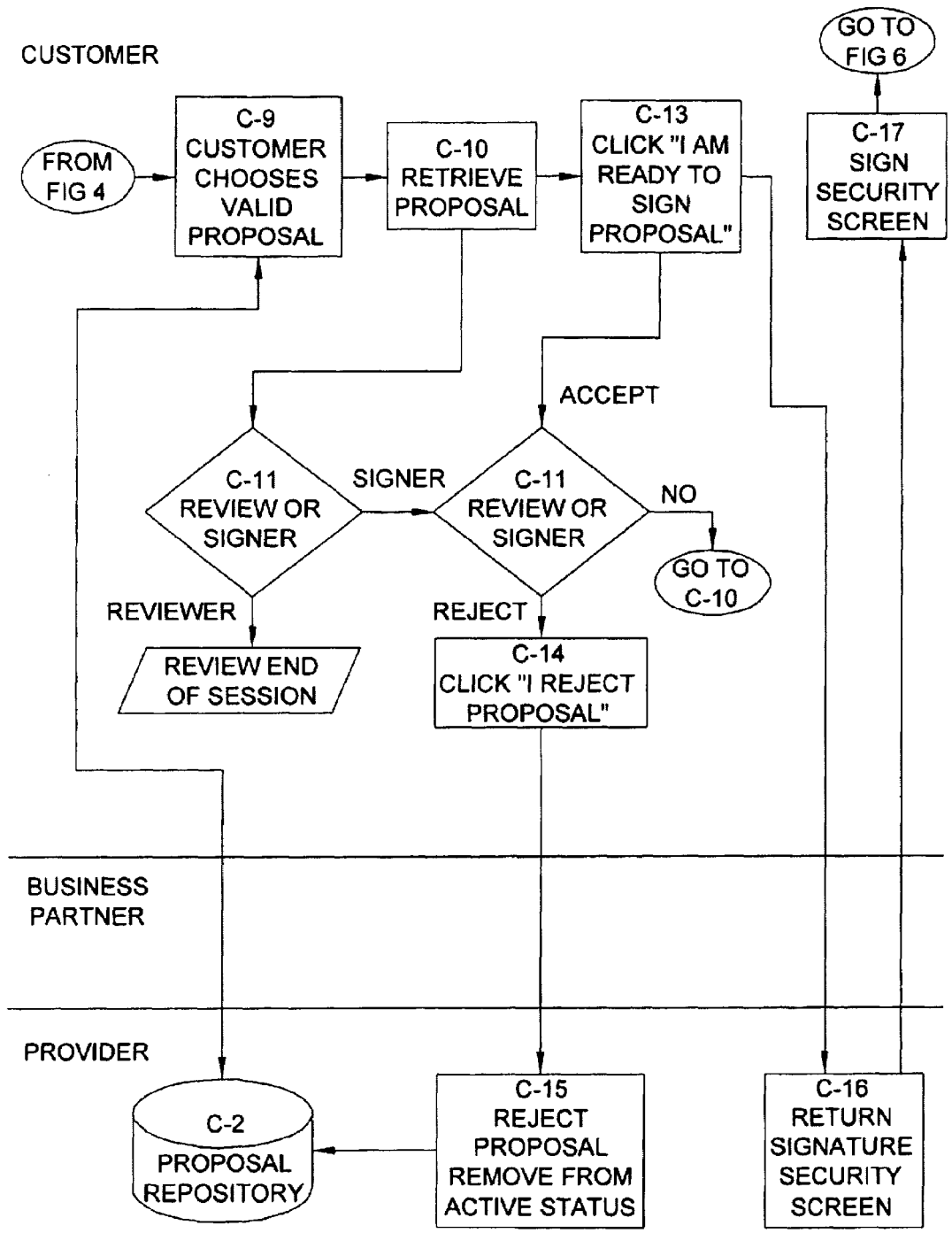
FIG. 5 depicts a third flow diagram according to the present invention.
Figure 6:
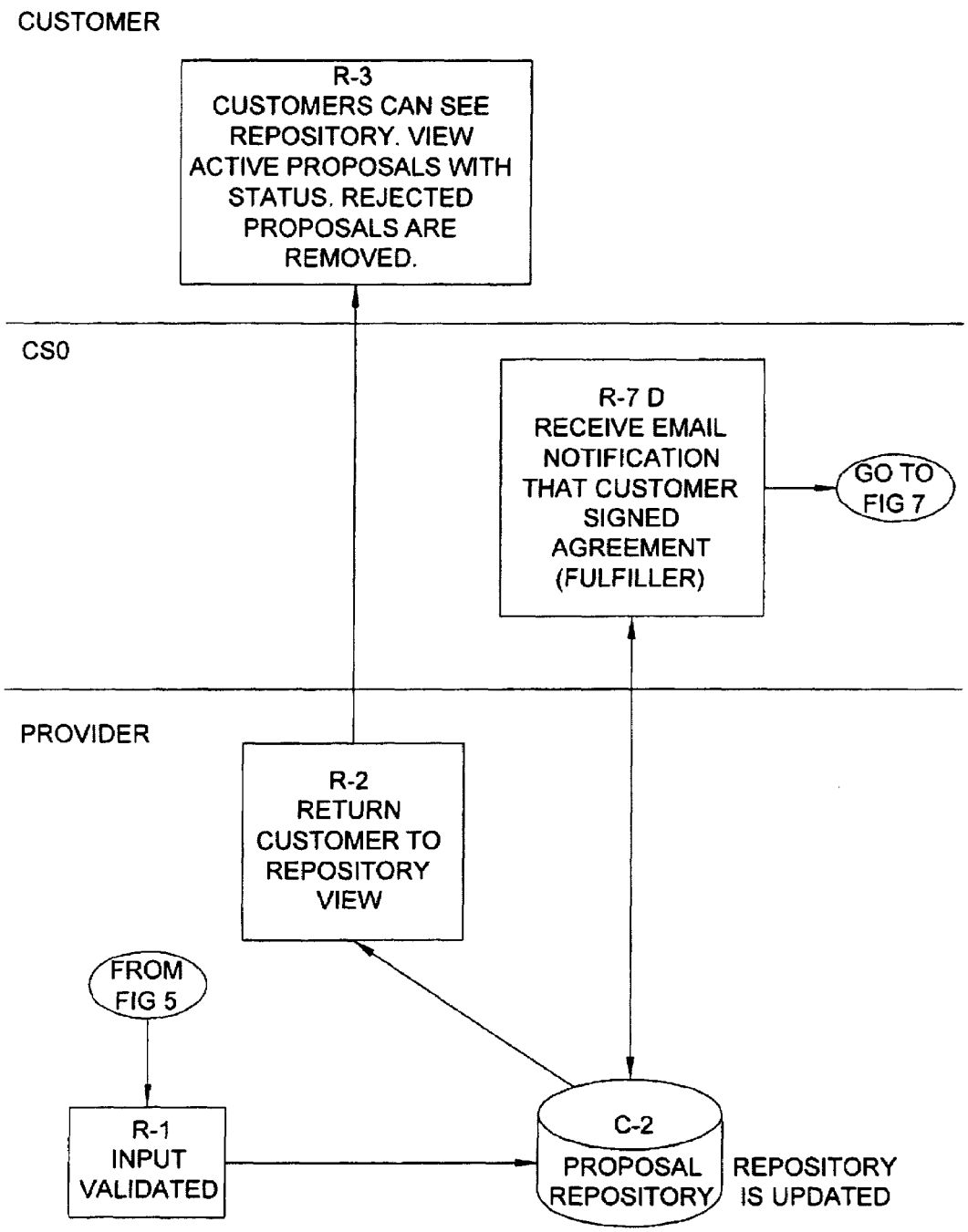
FIG. 6 depicts a fourth flow diagram according to the present invention.

Referring now to FIG. 5, the customer will chose the applicable proposal in step C-9 and review the same in step C-10. If the individual reviewing the proposal is only authorized to review and not execute, the session will end. However, if the individual is authorized to sign in step C-11, he/she will indicate whether they are in fact ready to sign the proposed contract in step C-12. If not, the individual will reject the proposed contract in step C-14, and the rejected proposed contract will be removed from active status in step C-15. If, however, the individual is ready to sign the agreement in step C-13, he/she will be brought to a signature security screen in step C-16, which can be signed in step C-17.

It should be understood that the repository/storing unit 32 (FIGS. 1-2) can contain many contracts. In a typical embodiment, the customer will be able to view all proposed contracts pertaining thereto. For example, referring to FIG. 6, after the customer has signed the approved and signed the contract, that input will be validated in step R-1 and the repository updated in step C-2. Thereafter, the customer will be returned to the general repository view in step R-2. In step R-2, the customer can view all proposals with active status, while rejected proposals are removed. In any event, assuming that the customer has signed the contract, the sales representative of provider will receive notification of the same in step R-7.

Figure 7:
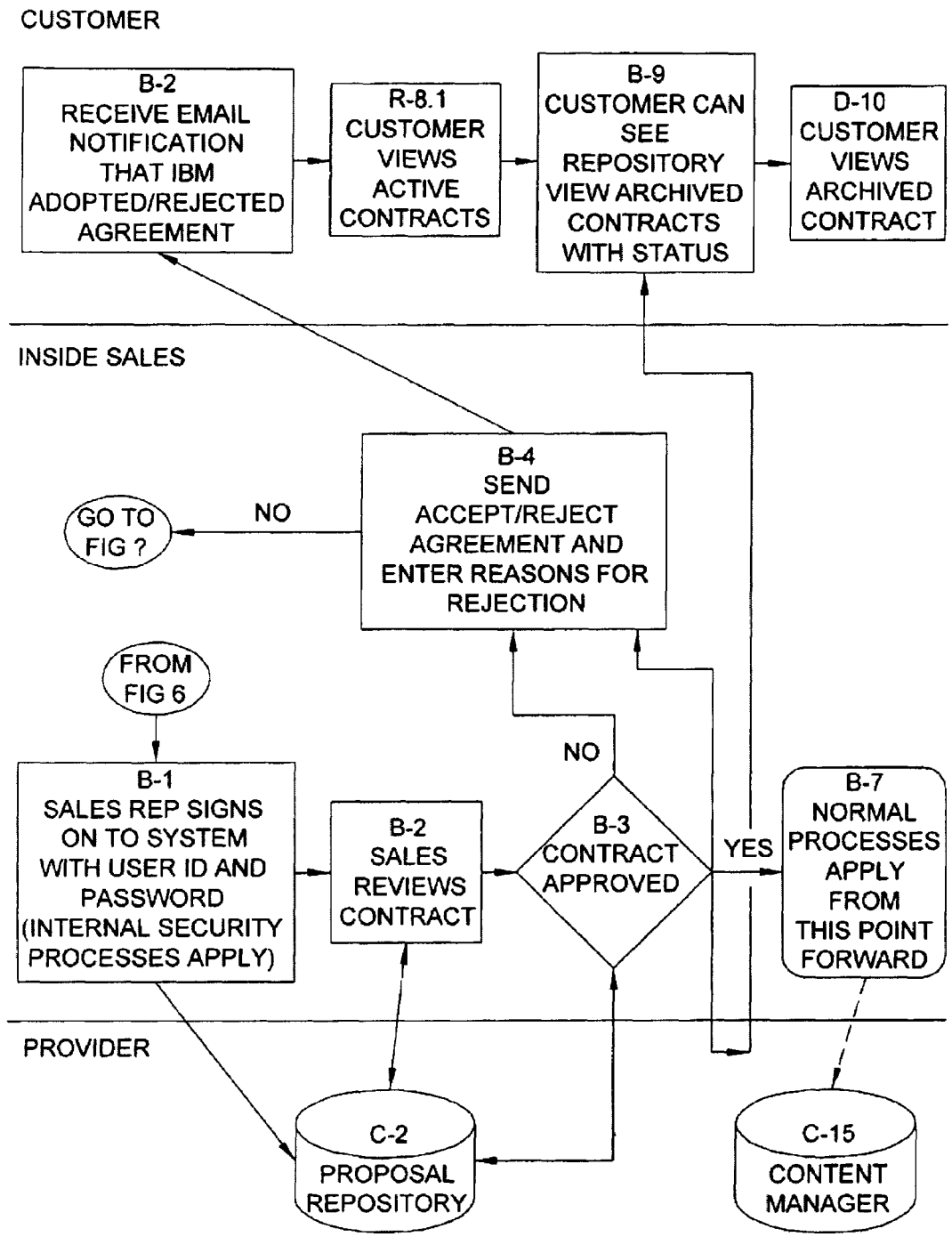
FIG. 7 depicts a fifth flow diagram according to the present invention.

The process from this point on is depicted in FIG. 7. As can be seen, after receiving notification of the customer' signing, the sales representative will sign onto the system in step B-1 and review the contract in step B-2. If the contract is not approved in step B-3, the reasons for rejection will be entered and sent in step B-4, which will result in a new proposal being developed as described in conjunction with FIG. 3. If, however, the contract is approved, a contract is formed and the process is ended in step B-7. In step B-8, the customer will receive notification that the provider accepted the proposal, and the customer can view the same in step R-3.1. To this extent, the customer can view the repository of archived contracts with their respective statuses in steps B-9 and B-10. As previously mentioned, image system 74 (FIG. 2) will generate a final image of the contract after its electronic execution. FIG. 8 depicts such an illustrative final image 100.

It should be appreciated that the different views and notifications of the present invention can include any of the interface pages shown in the two above-incorporated patent applications. They have not been shown herein for brevity purposes. While shown and described herein as an electronic sales and contracting method, it is understood that the invention further provides various alternative embodiments. For example, in one embodiment, the invention provides a computer-readable medium that includes computer program code to enable a computer infrastructure to perform/facilitate electronic sales and contracting. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 24 (FIG. 1) and/or storage system 32 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to perform or facilitate electronic sales and contracting. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides an electronic sales and contracting method. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 20 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. An electronic sales and contracting method, comprising:
    receiving input from a customer in a secure computer infrastructure, wherein the input pertains to an integrated Information Technology (IT) solution desired by the customer, wherein the integrated IT solution includes hardware, software and services related to the hardware and software, and wherein the integrated IT solution is provided to the customer by at least two distinct providers;
    receiving a purchase selection of a set of IT components for the integrated IT solution from the customer in the secure computer infrastructure;
    verifying within the secure computer infrastructure that each of the set of IT components is compatible with one another and of similar quality to one another;
    determining one or more recommendations to be made to the customer for the integrated IT solution within the secure computer infrastructure, wherein the one or more recommendations is based on the input and a current IT implementation of the customer;
    finalizing the integrated IT solution within the secure computer infrastructure for sale to the customer;
    developing a proposal to provide the integrated IT solution to the customer for at least two contracts, each contract being between the customer and a unique one of each of the at least two distinct providers of the integrated IT solution;
    securing each contract to prevent electronic access by a provider who is not a party to the contract within the secure computer infrastructure; and
    requesting approval and execution of the proposal from the customer and each provider.

2. The method of claim 1, wherein the set of IT components include at least one of a computer hardware component or a computer software component.

3. The method of claim 1, wherein the one or more recommendations correspond to one or more services that best match the set of IT components.

4. The method of claim 1, further comprising sending the one or more recommendations to the customer.

5. The method of claim 1, further comprising alerting the customer if each of the set of IT components is not of similar quality to one another.

6. The method of claim 1, further comprising:
    receiving login information from the customer in the secure computer infrastructure;
    authenticating the login information; and
    granting access to the customer to the secure computer infrastructure after the authenticating step.

7. The method of claim 6, wherein the receiving login information, the authenticating step and the granting step and performed prior to receiving the input from the customer.

8. The method of claim 1, further comprising polling the customer to receive the input.

9. The method of claim 1, wherein the developing step comprises:
    determining a price, within the secure computer infrastructure, to provide the integrated IT solution to the customer based on each of the at least two contracts; and
    automatically applying any adjustments to the price within the secure computer infrastructure.

10. An electronic sales and contracting system, comprising:
- a customer input system for receiving input from a customer in a secure computer infrastructure, wherein the input pertains to an integrated Information Technology (IT) solution desired by the customer, wherein the integrated IT solution includes hardware, software and services related to the hardware and software, and wherein the integrated IT solution is provided to the customer by at least two distinct providers;
- a selection system for receiving a purchase selection of a set of IT components for the integrated IT solution from the customer in the secure computer infrastructure;
- a quality verification system for verifying within the secure computer infrastructure that each of the set of IT components is compatible with one another and of similar quality to one another;
- a recommendation system for determining one or more recommendations to be made to the customer for the integrated IT solution within the secure computer infrastructure, wherein the one or more recommendations is based on the input and a current IT implementation of the customer;
- a solution finalization system for finalizing the integrated IT solution for sale to the customer within the secure computer infrastructure;
- a proposal development system for developing a proposal to provide the integrated IT solution to the customer for at least two contracts, each contract being between the customer and a unique one of each of the at least two distinct providers of the integrated IT solution;
- a security system for securing each contract to prevent electronic access by a provider who is not a party to the contract within the secure computer infrastructure; and
- a contract development system for requesting approval and execution of the proposal from the customer and each provider.

11. The system of claim 10, wherein the set of IT components include at least one of a computer hardware component or a computer software component.

12. The system of claim 10, wherein the one or more recommendations correspond to one or more services that best match the set of IT components.

13. The system of claim 10, wherein the recommendation system further communicates the one or more recommendations to the customer.

14. The system of claim 10, wherein the quality verification system further alerts the customer if each of the set of IT components is not of similar quality to one another.

15. The method of claim 10, further comprising an authentication system for receiving login information from the customer in the secure computer infrastructure, for authenticating the login information, and for granting access to the customer to the secure computer infrastructure after the authenticating step.

16. The system of claim 10, wherein the customer input system polls the customer to receive the input.

17. The system of claim 10, wherein the proposal development system determines a price, within the secure computer infrastructure, to provide the integrated IT solution to the customer based on each of the at least two contracts, and automatically applies any adjustments to the price within the secure computer infrastructure.

18. An electronic sales and contracting program product stored on a computer readable non-transitory storage medium, the computer readable non-transitory storage medium comprising program code for performing the following steps:
- receiving input from a customer in a secure computer infrastructure, wherein the input pertains to an integrated Information Technology (IT) solution desired by the customer, wherein the integrated IT solution includes hardware, software and services related to the hardware and software, and wherein the integrated IT solution is provided to the customer by at least two distinct providers;
- receiving a purchase selection of a set of IT components for the integrated IT solution from the customer in the secure computer infrastructure;
- verifying within the secure computer infrastructure that each of the set of IT components is compatible with one another and of similar quality to one another;
- determining one or more recommendations to be made to the customer for the integrated IT solution within the secure computer infrastructure, wherein the one or more recommendations is based on the input and a current IT implementation of the customer;
- finalizing the integrated IT solution for sale to the customer within the secure computer infrastructure;
- developing a proposal to provide the integrated IT solution to the customer for at least two contracts, each contract being between the customer and a unique one of each of the at least two distinct providers of the integrated IT solution;
- securing each contract to prevent electronic access by a provider who is not a party to the contract within the secure computer infrastructure; and
- requesting approval and execution of the proposal from the customer and each provider.

19. The program product of claim 18, wherein the set of IT components include at least one of a computer hardware component or a computer software component.

20. The program product of claim 18, wherein the one or more recommendations correspond to one or more services that best match the set of IT components.

21. The program product of claim 18, wherein the computer readable non-transitory storage medium further comprises program code for performing the following step:
- sending the one or more recommendations to the customer.

22. The program product of claim 18, wherein the computer readable non-transitory storage medium further comprises program code for performing the following step:
- alerting the customer if each of the set of IT components is not of similar quality to one another.

23. The program product of claim 18, wherein the computer readable non-transitory storage medium further comprises program code for performing the following steps:
- receiving login information from the customer in the secure computer infrastructure;
- authenticating the login information; and
- granting access to the customer to the secure computer infrastructure after the authenticating step.

24. The program product of claim 23, wherein the receiving login information, the authenticating step and the granting step and performed prior to receiving the input from the customer.

25. The program product of claim 18, wherein the computer readable non-transitory storage medium further comprises program code for performing the following step:
- polling the customer to receive the input.

26. The program product of claim 18, wherein the developing step comprises:
- determining a price, within the secure computer infrastructure, to provide the integrated IT solution to the customer based on each of the at least two contracts; and
- automatically applying any adjustments to the price within the secure computer infrastructure.

* * * * *